(12) United States Patent
Suryawanshi

(10) Patent No.: US 8,291,205 B2
(45) Date of Patent: Oct. 16, 2012

(54) METHOD FOR MANAGING THE RESET OF A DATA PROCESSOR

(75) Inventor: Ganesh R. Suryawanshi, Fargo, ND (US)

(73) Assignee: Deere & Company, Moline, IL (US)

( * ) Notice: Subject to any disclaimer, the term of this patent is extended or adjusted under 35 U.S.C. 154(b) by 812 days.

(21) Appl. No.: 12/472,737

(22) Filed: May 27, 2009

(65) Prior Publication Data

US 2010/0306518 A1 Dec. 2, 2010

(51) Int. Cl.
*G06F 15/177* (2006.01)

(52) U.S. Cl. .......................................................... 713/1

(58) Field of Classification Search ........................ 713/1
See application file for complete search history.

(56) References Cited

U.S. PATENT DOCUMENTS

| | | | |
|---|---|---|---|
| 5,381,540 A | 1/1995 | Adams et al. | |
| 5,704,038 A | 12/1997 | Mueller et al. | |
| 5,737,212 A | 4/1998 | Fang et al. | |
| 5,867,718 A * | 2/1999 | Intrater et al. | 713/323 |
| 5,880,568 A | 3/1999 | Bederna et al. | |
| 5,960,195 A * | 9/1999 | Kang et al. | 713/1 |
| 7,107,482 B2 * | 9/2006 | Murai et al. | 714/6.31 |
| 7,191,323 B2 * | 3/2007 | Takahashi | 713/1 |
| 7,334,167 B2 | 2/2008 | Stabrowski | |
| 7,340,596 B1 | 3/2008 | Crosland et al. | |
| 7,350,178 B1 | 3/2008 | Crosland et al. | |
| 7,484,133 B2 | 1/2009 | Dybsetter et al. | |

FOREIGN PATENT DOCUMENTS

JP 1154258 6/1989

* cited by examiner

*Primary Examiner* — Kim Huynh
*Assistant Examiner* — Eric Chang

(57) ABSTRACT

A method for managing the reset of a data processor comprises receiving a first software reset instruction to reset software for operating the data processor. A checksum or value in a data storage register is modified according to a first preestablished logical or mathematical operation in response to the first software reset instruction. A software watchdog reset flag is set in response to the first software reset instruction. A reset is identified as a software reset if the software watchdog reset flag is set and if the checksum in the data storage register is modified in accordance with the first preestablished mathematical or logical operation.

10 Claims, 5 Drawing Sheets

METHOD FOR MANAGING THE RESET OF A DATA PROCESSOR

FIELD OF THE INVENTION

The present invention relates to a method for managing the reset of a data processor, such as a microprocessor.

BACKGROUND OF THE INVENTION

A data processor may support a watchdog reset or watchdog timer reset that is triggered in response to a software fault or hardware fault. A programmer may want to establish a separate software instruction (e.g., custom software instruction) to reset the data processor that is distinct from the watchdog reset. In some circumstances, the programmer or user of the data processor may be better served if an interrupt is generated, if the program counter is merely reset or reloaded, or if certain input/output devices are merely reset, among other possibilities, rather than resetting the data processor via an inflexible watchdog timer. However, the data processor may not support such a separate software instruction or may only support the watchdog reset. Thus, there is a need for an improved method for managing the reset of a data processor.

SUMMARY OF THE INVENTION

A method for managing the reset of a data processor comprises receiving a first software reset instruction to reset software for operating the data processor. A checksum or value in a data storage register is modified according to a first preestablished logical or mathematical operation in response to the first software reset instruction. A software watchdog reset flag is set in response to the first software reset instruction. A reset is identified as a software reset if the software watchdog reset flag is set and if the checksum in the data storage register is modified in accordance with the first preestablished mathematical or logical operation.

DESCRIPTION OF THE PREFERRED EMBODIMENT

Figure 1:
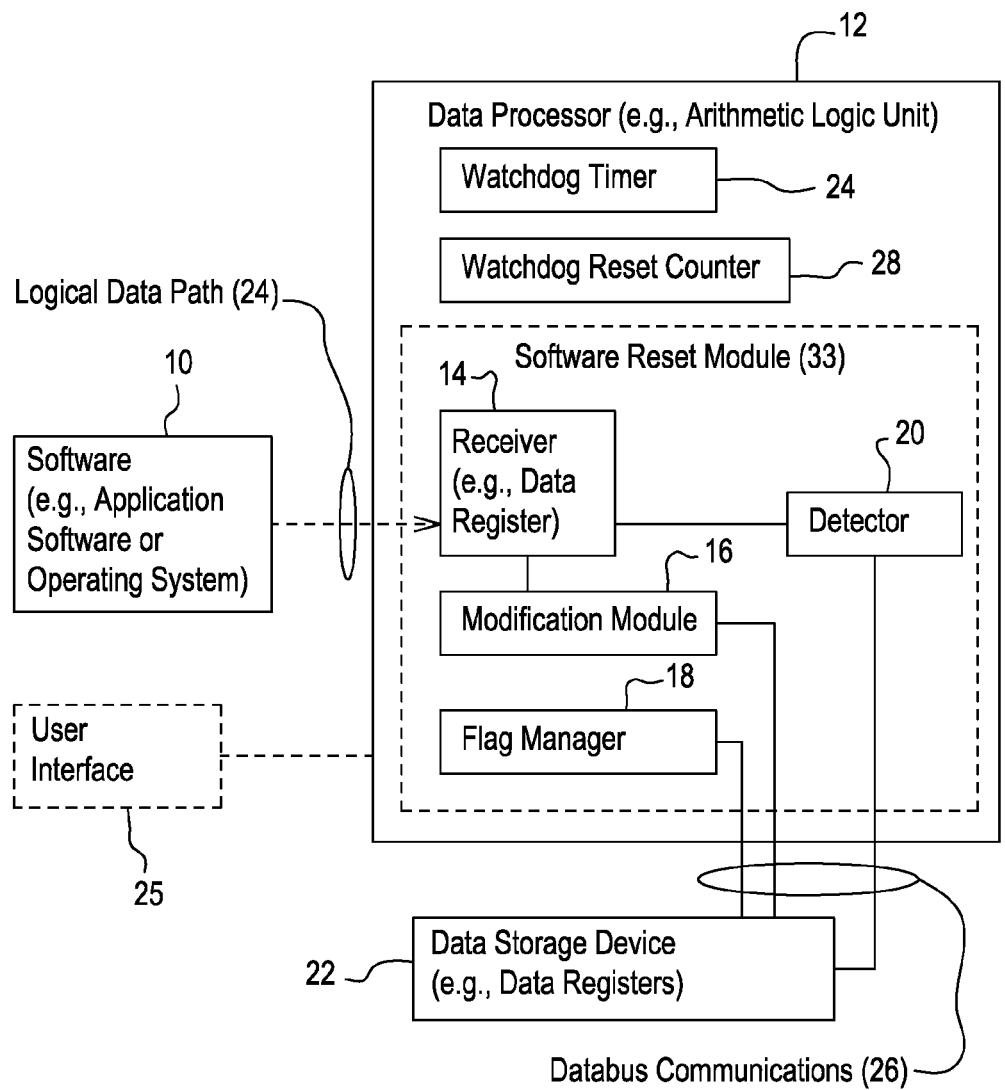
FIG. 1 is block diagram of one embodiment of a system for managing the reset of a data processor.

In accordance with one embodiment, FIG. 1 illustrates a system for managing the reset of a data processor 12. The system comprises a data processor 12 that is capable of communicating with software 10 via a logical data path, a physical data path, or both. A logical data path comprises the communication of data within or between one or more software programs. A physical data path comprises communications of data over a data bus, transmission line, or a communications line.

The data processor 12 is coupled to a data storage device 22 via a data bus. The data bus may be external to the data processor 12 or integral with the data processor 12. Similarly, the data storage device 22 may comprise electronic memory that is integrated into the data processor 12 or separate from the data processor 12.

A data processor 12 may comprise a microprocessor, a microcontroller, a logic circuit, a programmable logic array, an application specific integrated circuit, an arithmetic logic unit of a microprocessor, or any other device for processing data. In one embodiment, the data processor 12 comprises a software reset module 33, a watchdog timer 24 and a watchdog reset counter 28. In one configuration, the software reset module 33 comprises a receiver 14, a detector 20, a modification module 16 and a flag manager 18. The receiver 14 may comprise a data register, an input/output device, a data storage device (e.g., electronic memory), or another device for receiving data from software 10, such as application software or an operating system via a logical data path 24 or otherwise. A receiver 14 communicates to a modification module 16 and a detector 20. The modification module 16 and the flag manager 18 are coupled to a data storage device 22 via a data bus. The detector 20 is coupled to a data storage device 22 via a data bus. The receiver 14, the modification module 16, the flag manager 18 and the detector 20 are capable of communicating with the data storage device 22 via one or more data bus communications 26. The data storage device 22 supports storage and retrieval of data by the data processor 12 or the software reset module 33.

The software 10 may comprise application software, an operating system software, or both. The software 10 is capable of communicating with the data processor 12 or a receiver 14 of the data processor 12 via a logical data path 24, for example.

The user interface 25 may comprise one or more of the following items: keyboard, a keypad, a control panel, a switch, a display, a pointing device (e.g., electronic mouse). The user interface 25 is shown as dashed lines because the user interface may be optional or attached as part of a diagnostics terminal for diagnosing errors or problems in the operation of a software 10 or the data processor 12.

Referring to the illustrative embodiment of FIG. 1, a watchdog reset of a data processor 12 (e.g., microprocessor or microcontroller) may be triggered by a watchdog timer 24, where the watchdog reset resets or restarts (e.g., or switches off and on) the data processor 12 or the data processor 12 and associated input/output hardware. For example, the watchdog timer 24 may be integrated into the data processor 12 or may comprise a separate hardware circuit. A data processor 12 may support a watchdog reset that is triggered in response to a software fault or hardware fault. For example, a software fault, a software malfunction, a hardware fault, or a hardware malfunction causes or results in the signal or appropriate code not being generated or sent to the watchdog timer 24 prior to timeout of the watchdog timer 24, which triggers the watchdog reset to occur.

As used herein, the watchdog timer 24 means a timer or other device that triggers a watchdog reset if the watchdog timer 24 does not receive a signal (e.g., a pulse), or an appropriate digital code or codes (e.g., at the Watchdog timer control register) prior to the expiration of a time period (e.g., prior to timeout) established by the watchdog timer 24. However, if the signal or appropriate digital code is received by the watchdog timer 24 prior to the expiration of the time period, the watchdog timer 24 establishes a new or next time period and the operation of the data processor 12 continues in an uninterrupted manner, subject to continued sending (e.g., possibly updating) of the signal or appropriate digital code to the watchdog timer 24 at corresponding time intervals.

The watchdog timer 24 is generally associated with a watchdog reset counter 28, or other data register, which counts and stores the number of times that the watchdog timer 24 resets the data processor 12 over a certain time period. If the watchdog reset counter 28 exceeds a maximum threshold, the data processor 12 or its associated software 10 instructions may limit the data processor 12 to operate in a boot mode, or other restricted mode with limited functionality. An accurate count in the watchdog reset counter 28 assures that the data processor 12 is limited to the boot mode or other restricted mode in appropriate circumstances.

A software reset module 33 comprises software program instructions that (a) may act in a supervisory mode with respect to the watchdog timer 24 or that may control the watchdog timer 24, or (b) may support a software reset mode that is separate and distinct from the watchdog reset mode. The software reset mode may be associated with independent resetting operations, reinitializations, or register clearing operations that are customizable or not supported by the watchdog reset mode. The software reset module 33 may also comprise hardware integral with or associated with the data processor 12.

The software reset module 33 may operate independently of a value of the watchdog reset counter 28 or a maximum value of the watchdog reset counter 28. In one example, the software reset module 33 may reset the data processor 12 based on the receipt of a fault signal or fault code. In another example, the software reset module 33 may reset the data processor 12 and one or more input/output devices associated with the data processor 12 based on the receipt of the fault signal or fault code. Further, in an alternative embodiment, the software reset module 33 may comprise instructions for resetting the data processor 12 and doing one or more of the following: generating an interrupt, reinitializing internal codes within the data processor 12, or resetting registers or data storage values within the data processor 12, or associated with the data processor 12, prior to, during, or after the software reset to efficiently and reliably restore full or the targeted functionality of the data processor 12 and associated input/output devices. For instance, the software reset module 33 may decrement, clear, or reset the watchdog reset counter 28 (or a similar register or data storage value) upon a software reset if the software reset module 33 or data processor 12 determines that the data processor 12 is trapped or stuck in a boot mode or other undesired, inappropriate, or restricted mode of operation of the data processor 12, because a maximum value of the watchdog reset counter 28 has been exceeded, and if a software reset would resolve the hardware or software fault or malfunction.

Figure 2A:
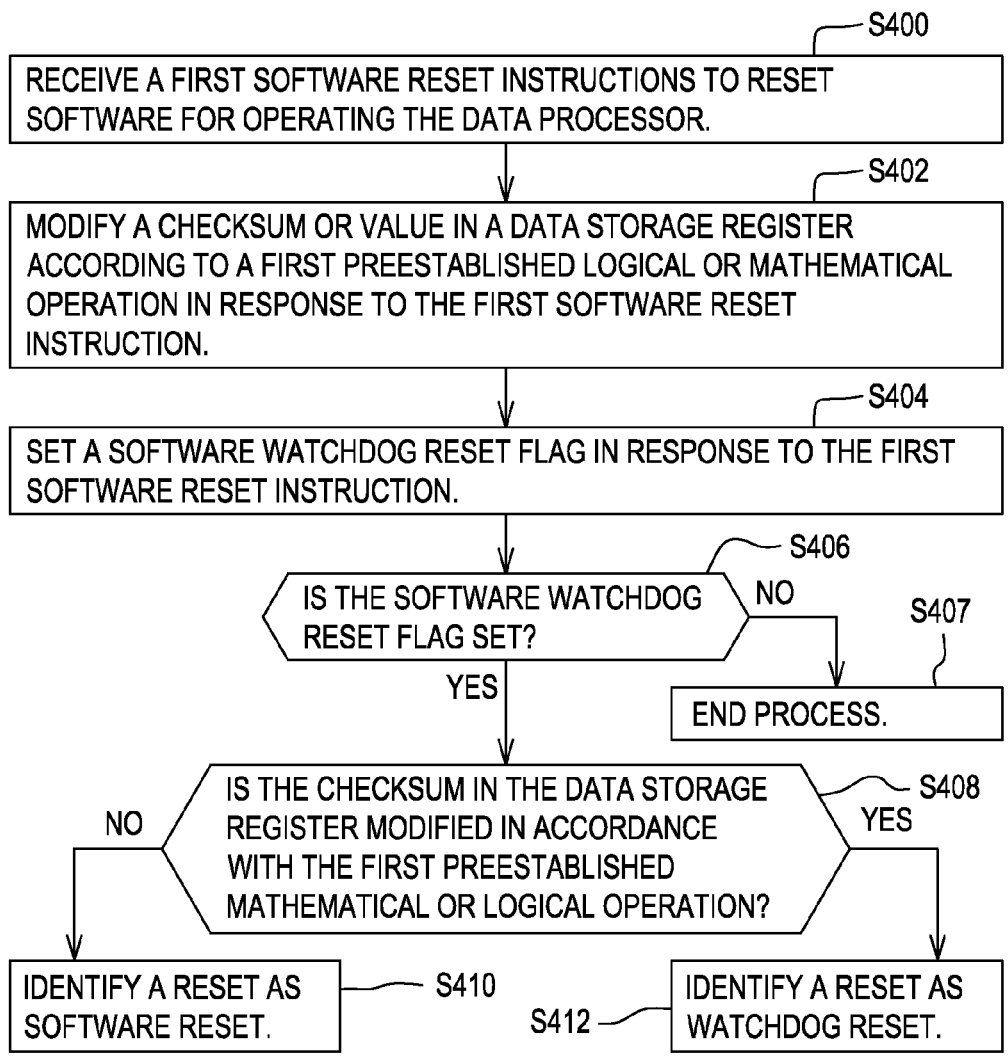
FIG. 2A is a flow chart of one embodiment of a method for managing the reset of a data processor.

FIG. 2A illustrates a flow chart of a method for managing the reset of a data processor 12. The method of FIG. 2A begins in step S400.

In step S400, a data processor 12, software reset module 33, or receiver 14 receives a first software reset instruction to reset software 10 for operating the data processor 12. The first software reset instruction is distinct from a software watchdog reset that is managed by the watchdog timer 24.

In step S402, a data processor 12, software reset module, or modification module 16 modifies a checksum or value in a data storage register (e.g., of the data processor 12 or the data storage device 22) according to a first preset established logical or mathematical operation in response to the first software reset instruction. Step S402 may be carried out in accordance with various techniques that may be applied alternately or cumulatively. In accordance with a first technique, the modification of the checksum comprises corrupting the checksum by complementing the checksum. Accordingly, under the first technique, the first preset established logical or mathematical operation comprises complementing or inverting one checksum or data registers, or one or more binary digits of the checksum. For example, under the first technique, the modification module 16 may support inverting all binary digits of the checksum, the most significant bit or bits of the checksum, the least significant bit or bits of the checksum, or other modifications.

In accordance with a second technique, the modification of the checksum comprises applying the check sum as an input to a Boolean logical operation, and replacing the checksum in the data storage register with a resultant value outputted from the Boolean logical operation. For instance, the Boolean logical operation may comprise a NOT function or inverter gate.

Under the second technique, the first preset established logical or mathematical operation comprises a Boolean logical operation (e.g., an inverter). In accordance with a third technique, the modification of the checksum comprises applying the checksum as an input to a mathematical operation, and replacing the checksum in the data storage register with a resultant value outputted from the mathematical operation. For instance, the mathematical operation may comprise adding a binary word via binary addition or other binary mathematical operations to yield the complement value of an initial or previous value of the checksum or data register.

Under a third technique, the first preset established logical or mathematical operation comprises at least one of the following: addition (e.g., binary addition), subtraction (e.g., binary subtraction), multiplication (e.g., binary multiplication), division (e.g., binary division), or other manipulation of the checksum by a known value, or in accordance with an established equation, formula, cipher or encoding/decoding procedure.

In step S404, a data processor 12, software reset module 33, or flag manager 18 sets a software watchdog reset flag in response to the first software reset instruction.

In step S406, the data processor 12, software reset module 33, or detector 20 determines whether the software watchdog flag is set. If the data processor 12 or detector 20 determines that the software watchdog reset flag is set, the method continues with step S408. However, if the data processor 12 or detector 20 determines that the software watchdog reset flag is not set, the method ends the process or method in step S407.

In step S408, the data processor 12, software reset module 33, or detector 20 determines whether or not the checksum in the data storage register (e.g., of the data processor 12 or the data storage device 22) is modified in accordance with the first preestablished mathematical or logical operation. If the data processor 12 or detector 20 determines that the checksum in the data storage register is modified in accordance with the first preestablished mathematical or logical operation, the method continues in step S412. However, if the data processor 12 or detector 20 determines that the checksum in the data storage register is not modified in accordance with the first preestablished mathematical or logical operation, the method continues in step S410.

In step S410, the data processor 12, software reset module 33, or detector 20 identifies the reset as a software reset.

In step S412, the data processor 12, software reset module 33, or detector 20 identifies the reset as a watchdog reset.

Figure 2B:
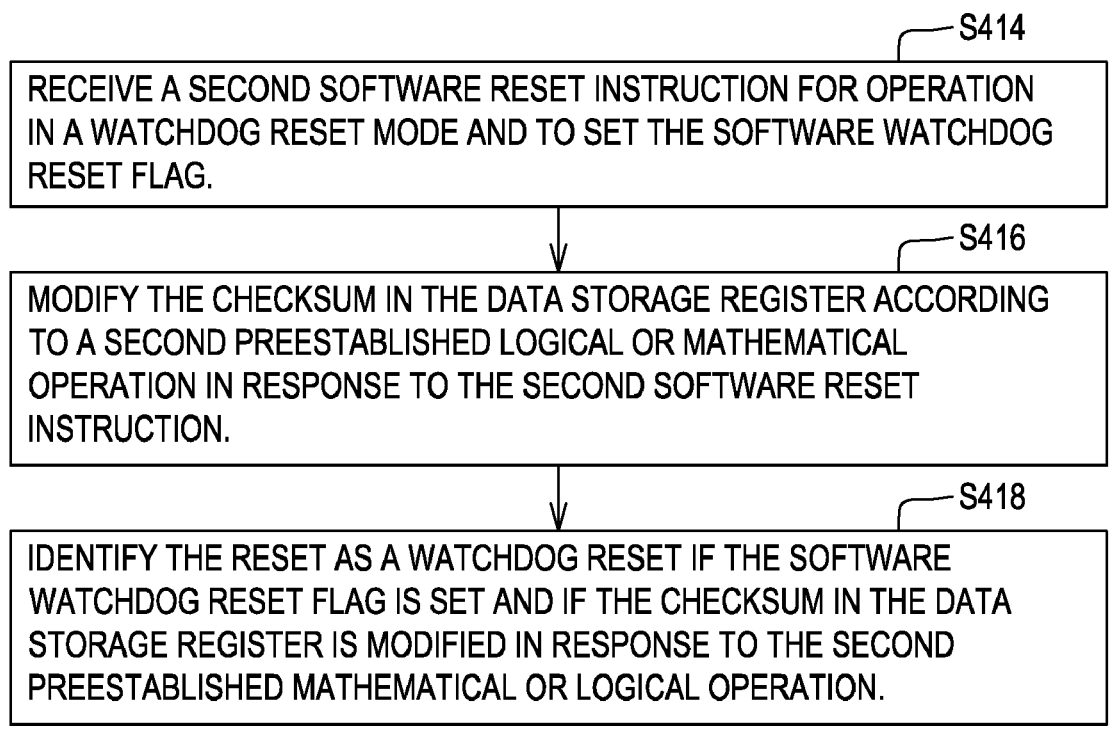
FIG. 2B is a flow chart of another embodiment of a method for managing the reset of a data processor.

The method of FIG. 2B is similar to the method of FIG. 2A, except the method of FIG. 2B includes additional steps or procedures. Like steps or procedures are indicate by like reference numbers.

After step S410 in step S414, the receiver 14, software reset module 33, or data processor 12 receives a second software reset instruction for operation in a watchdog reset mode. In one example of executing step S410, the software watchdog reset flag is set in response to the second software reset instruction.

In step S416, the modification module 16 or data processor 12 modifies the checksum in the data storage register according to a second preestablished logical or mathematical operation in response to the second software reset instruction. In one example, the second preestablished logical or mathematical operation comprises an inverted form, complement or inversion of the first preestablished logical or mathematical operation. Further, the inverted form may be selected to return the checksum to its previous or original state prior to the application of the first preestablished logical or mathematical operation. The data storage register may comprise reserved random access memory (e.g., in the data storage device 22) that is not accessible by an application associated with the software 10.

In step S418, the detector 20, software reset module 33, or data processor 12 identifies the reset as a watchdog reset if the software watchdog reset flag is set and if the checksum in the data storage register (e.g. in the data storage device 22) is modified in response to the second preestablished mathematical or logical operation.

Figure 3:
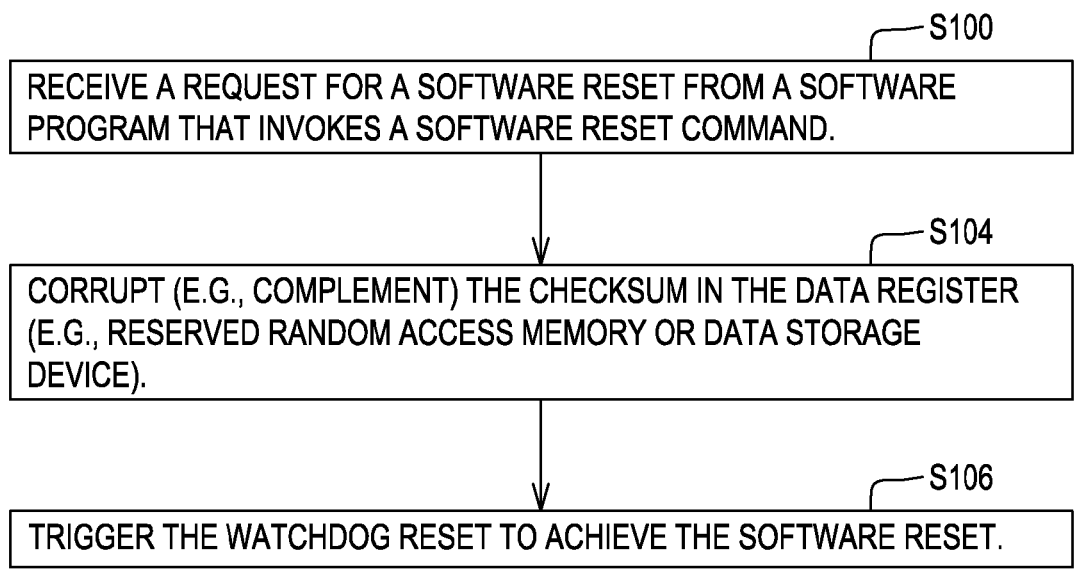
FIG. 3 is a flow chart of yet another embodiment of a method for establishing a software reset of a data processor.

The method of FIG. 3 shows a flow chart of a method for establishing a software reset function. The method of FIG. 3 begins in step S100.

In step S100, a software reset is requested by a software 10 program that invokes a software reset command. For example, the software 10 generates a software reset command that is sent to a data processor 12, a software reset module 33, or a receiver 14 of a data processor 12.

In step S104, it corrupts (e.g., complements) the checksum in the data register (e.g., reserved random access memory or data storage device 22). After step S104, the method continues with step S106.

In step S106, the data processor 12 triggers the watchdog reset to achieve the software reset. The watchdog reset in conjunction with the managed corruption of the checksum or data register is used to emulate a custom software reset. In step S106, the data processor 12 or software reset module 33 controls or operates the watchdog timer 24 in a supervisory or managing role that modifies its usual operation or purpose.

Figure 4:
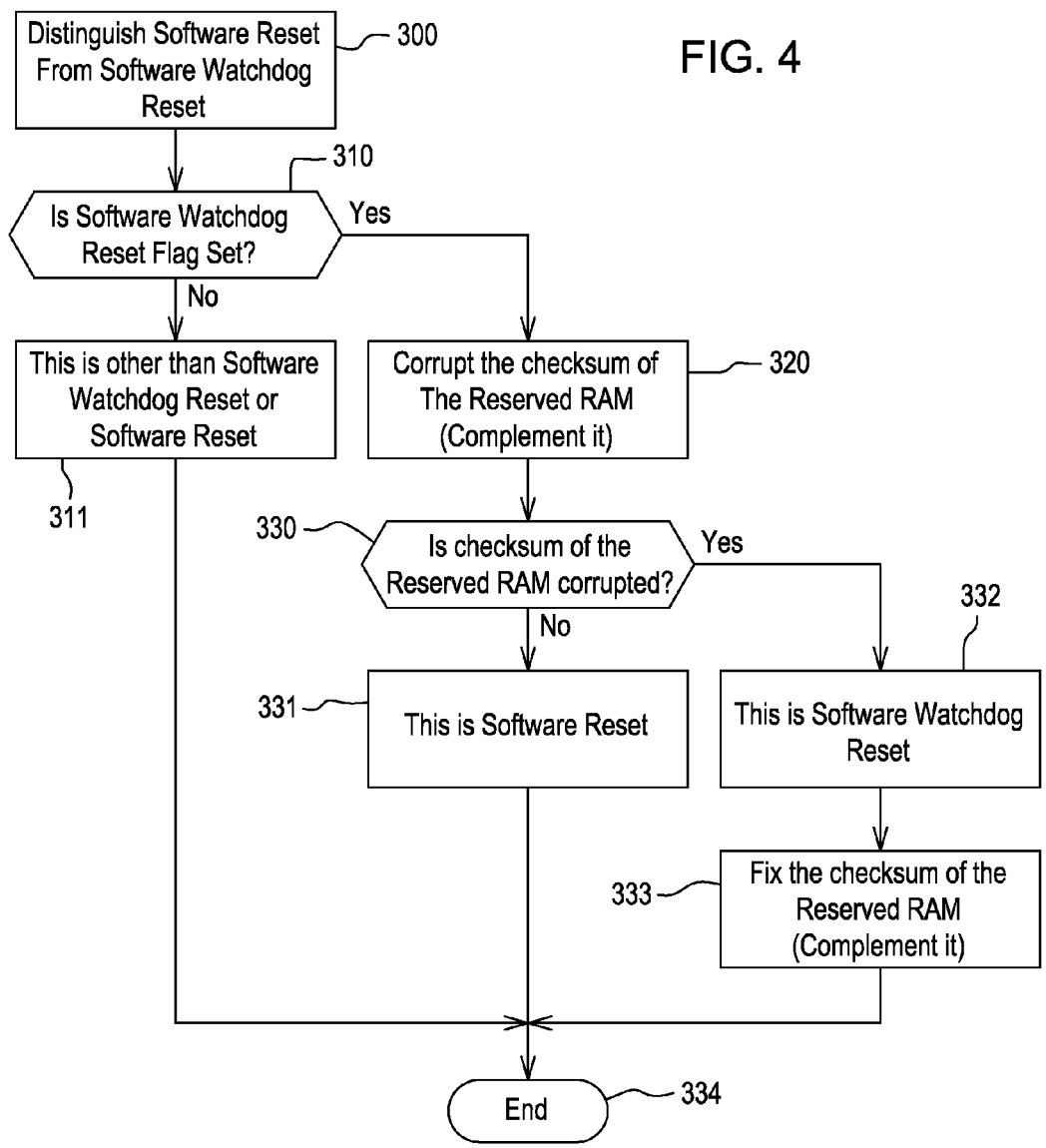
FIG. 4 is a flow chart of another method for distinguishing a software reset from software watchdog reset.

FIG. 4 illustrates a flow chart of a method for distinguishing a software reset from a software watchdog reset. The method of FIG. 4 begins in step S300.

In step S300, a data processor 12, software reset module 33, or detector 20 initiates a query, procedure or software command to distinguish a software reset from a software watchdog reset. For example, the data processor 12 may initiate a query or procedure to distinguish the software reset from a software watchdog reset in response from input from a user interface 25 to the processor 12.

In step S310, the data processor 12, software reset module 33, or detector 20 determines whether a software watchdog flag is set. If the data processor 12 or detector 20 determines that a software watchdog flag is set (e.g., to indicate operation in the software watchdog mode or software watchdog reset mode) in step S310, then the method continues with S320. However, if the data processor 12 or detector 20 determines that a software watchdog flag is not set, then the method continues with step S311.

In step S320, the modification module 16 or the data processor 12 corrupts or modifies the checksum in a data register (e.g., reserved random access memory (RAM) of the data processor 12 or of the data storage device 22).

In step S311, the data processor 12 or detector 20 determines that the current state or operational mode of the data processor 12 is not associated with a software watchdog reset or a software reset.

In step S330, a data processor 12 or detector 20 determines if a checksum of the data register (e.g., reserved random access memory (RAM) of the data processor 12 or of the data storage device 22) is modified or corrupted. If the data processor 12 or detector 20 determines that the checksum is modified or corrupted, the method continues in step S332. However, if the data processor 12 or detector 20 determines that the checksum is not modified or corrupted, then the method continues with step S331.

In step S331, the data processor 12 or detector 20 determines that the data processor 12 is in a software reset mode. The data processor 12 may send the determination or software reset mode to a display device for displaying to a user or in response to a query of a user via a user interface, for example.

In step S332, the data processor 12 or detector 20 determines that the data processor 12 is in a software watchdog reset mode. The data processor 12 may send the determination or software reset mode to a display device of a user interface 25 for displaying to a user or in response to a query of a user via a user interface 25, for example.

In step S333, the data processor 12 modifies or fixes (e.g., complements) the checksum of the data register (e.g., in the reserved random access memory of the data processor 12 or of the data storage device 22).

In step S334, the method ends after step S311, step S331 or step S333.

The method of FIG. 4, the system of FIG. 1, and other methods and variations described herein, are well suited for determining or distinguishing between whether the data processor 12 is operating in a software reset mode or in a software watchdog reset mode. The reliable and accurate determination of the operation mode facilitates keeping an accurate count of the watchdog reset counter 24, where the watchdog reset counter 28 is incremented when the data processor 12 is in the watchdog reset mode (or making a transition to or from the watchdog reset mode) and not incremented when in the software reset mode. The counter 28 provides reliable data on whether to limit the data processor 12 to operation in a boot mode or other restricted mode of operation in appropriate circumstances where a maximum count in the counter 28 is truly exceeded. Alternately, if the data processor 12 is operating in a software reset mode, the data processor 12 may use appropriate ancillary instructions or customizable instructions to properly reset the data processor 12 and one or more input/output devices, where the ancillary instructions are not otherwise available in the watchdog reset mode. As previously noted, such ancillary instructions or customizable instructions may relate to reinitialization procedures, clearing registers, or generating interrupts, among other things, for example.

Having described the preferred embodiment, it will become apparent that various modifications can be made without departing from the scope of the invention as defined in the accompanying claims.

I claim:

1. A method for managing the reset of a data processor, the method comprising:
   receiving a first reset instruction to reset software for operating the data processor;
   in a software reset mode distinct from a watchdog reset mode modifying a checksum in a data storage register according to a first preestablished logical or mathematical operation in response to the first reset instruction, setting a software watchdog reset flag in response to the first reset instruction;

resetting the data processor; and identifying a reset as a software reset if the software watchdog reset flag is set and if the checksum in the data storage register is modified in accordance with the first preestablished mathematical or logical operation.

2. The method according to claim 1 wherein the modifying of the checksum comprises corrupting the checksum by complementing the checksum.

3. The method according to claim 1 wherein the modifying of the checksum comprises:

applying the checksum as an input to a Boolean logical operation; and replacing the checksum in the data storage register with a resultant value outputted from the Boolean logical operation.

4. The method according to claim 1 wherein the modifying of the checksum comprises:

applying the checksum as an input to a mathematical operation; and replacing the checksum in the data storage register with a resultant value outputted from the mathematical operation.

5. The method according to claim 4 wherein the mathematical operation comprises at least one of the following: addition, subtraction, multiplication or division of the checksum by a known value.

6. The method according to claim 1 further comprising:

receiving a second reset instruction for operating in the watchdog reset mode, modifying the checksum in the data storage register according a second preestablished logical or mathematical operation in response to the second reset instruction;

identifying a reset as a watchdog reset if the software watchdog reset flag is set and if the checksum in the data storage register is modified in response to the second preestablished mathematical or logical operation.

7. The method according to claim 6 wherein the second preestablished logical or mathematical operation comprises an inverted form of the first preestablished logical or mathematical operation.

8. The method according to claim 6 further comprising:

setting a software watchdog reset flag in response to the second reset instruction.

9. The method according to claim 1 wherein the data storage register comprises reserved random access memory that is not accessible by an application associated with the software.

10. A system for managing the reset of a data processor, the system comprising:

a receiver for receiving a first reset instruction to reset software for operating the data processor;

a modification module for modifying a checksum in a data storage register according to a first preestablished logical or mathematical operation in response to the first reset instruction, in a software reset mode distinct from a watchdog reset mode a flag manager for setting a software watchdog reset flag in response to the first software reset instruction;

a software reset module that resets the data processor; and a detector for identifying a reset as a software reset if the software watchdog reset flag is set and if the checksum in the data storage register is modified in accordance with the first preestablished mathematical or logical operation.

* * * * *